United States Patent [19]

Singer

[11] 3,899,735
[45] Aug. 12, 1975

[54] VOLTAGE DETECTOR FOR DETECTING AC VOLTAGES

[76] Inventor: Edouard Singer, 53, rue de Mulhouse, 68790 Morschwiller-le-Bas, France

[22] Filed: Jan. 23, 1974

[21] Appl. No.: 435,776

Related U.S. Application Data

[63] Continuation-in-part of Ser. No. 237,108, March 22, 1972, abandoned.

[30] Foreign Application Priority Data

Mar. 22, 1971 France .............................. 71.11200
Jan. 19, 1972 France .............................. 72.02482

[52] U.S. Cl. .................. 324/122; 324/96; 324/133
[51] Int. Cl. ...................... G01r 13/40; G01r 19/16
[58] Field of Search ...................... 324/122, 96, 133

[56] References Cited
UNITED STATES PATENTS

| | | | |
|---|---|---|---|
| 2,081,839 | 5/1937 | Rankin | 324/96 |
| 3,399,348 | 8/1968 | Praglin et al. | 324/96 |
| 3,425,049 | 1/1969 | Robinson | 324/133 |

*Primary Examiner*—Alfred E. Smith
*Assistant Examiner*—Ernest F. Karlsen
*Attorney, Agent, or Firm*—Robert E. Burns; Emmanuel J. Lobato; Bruce L. Adams

[57] ABSTRACT

An ac voltage detector comprising a detecting circuit for detecting a voltage under test and an indicating circuit for indicating that the voltage under test has a magnitude greater than a selected voltage threshold value. The voltage threshold value is selected by means of an electric circuit connected between the detecting circuit and the indicating circuit for selectively adjusting the threshold value at which the indicating circuit will indicate the voltage under test. The voltage detector also includes a testing circuit for testing that the voltage detector is functioning properly.

12 Claims, 5 Drawing Figures

VOLTAGE DETECTOR FOR DETECTING AC VOLTAGES

CROSS-REFERENCES TO RELATED APPLICATIONS

This application is a continuation-in-part of U.S. Pat. Application SN 237,108, filed on Mar. 22, 1972, now abandoned.

BACKGROUND OF THE INVENTION

The present invention relates to a monopolar detection device for detecting voltages, in particular alternating voltages.

Portable voltage detectors for detecting alternating voltages are well known in the art. A well known instrument, comprising an incandescent neon gas lamp, is carried by the operator and operated by him as an ordinary tool. When the operator applies the contact probe of the instrument to a live lead and makes contact with ground by means of one of his fingers for example, the neon lamp is illuminated thus indicating the presence of a voltage. The circuit is thus completed through the operator when the operator is grounded and he is protected by the resistance of the incandescent neon gas lamp.

The above mentioned instrument however may only be used for voltages on the order of several volts or maybe a thousand volts because of the safety hazards that are involved.

Detectors have been constructed using a neon lamp that are able to operate at much higher voltages than that of the aforementioned voltage detector and with a maximum of safety for the operator. These detectors, which are of simple construction and inexpensive, may operate over a large range of voltages. Unfortunately however, the neon bulb provides only a faint illumination when it is energized and it has been shown that the faint illumination is quite inadequate to be seen with any certainty when the instrument is used in bright sunlight.

Industrial electronic detectors for alternating voltages are also known wherein a fraction of the voltage to be detected is applied to the input of an amplifier controlling the operation of an alarm signal. These electronic detectors are frequently too sensitive, resulting in incorrect readings when in the presence of static voltages or inteference signals.

Another type of detector, comprising a gas tube, is disclosed in the French Pat. No. 1,570,667 and it employs the idea of an internal light detection. In the device disclosed in the French Patent, the glow discharged in a rare gas tube excites a photo-sensitive element arranged so as to receive the light flux from the tube. The photo-sensitive element controls an amplifier connected to a source of voltage and a signaling element. This light detection chain makes it possible to obtain an amplification of the light signal or a transformation of the latter into another method for signalling or indicating.

However, instruments of this type do not have complete detection safety since they do not include any test circuitry to show that there are working correctly and they have only one detection chain and do not include a variable voltage threshold circuit.

SUMMARY OF THE INVENTION

It is thus an object of the present invention to provide a voltage detector that has all of the advantages of the prior art voltage detectors and which eliminates the disadvantages of the prior art voltage detectors to obtain a voltage detector that has fool-proof detection capability and maximum operational safety.

Another object of the present invention is to provide a voltage detector having the ability to vary the voltage threshold value for which the indicating circuitry will indicate the voltage under test is present.

A still further object of the present invention is to provide a test capability to test that the voltage detector is functioning properly in order to determine that it is operational before it is used to detect a voltage under test.

Another object of the present invention is to provide a voltage detector that is housed in a compact elongated unitary casing that is made of insulating material and has a self-contained power supply to provide maximum safety for the operator.

Still another object of the present invention is to provide circuitry allowing the detector to increase the range of voltages that it may detect without any decrease in safety for the operator.

These and other objects of the invention are carried out by the voltage detector comprising detecting means responsive to a voltage under test during use for developing light energy having a magnitude proportional to the magnitude of the voltage under test and light sensitive means responsive to the light energy for developing an electrical signal whenever the magnitude of the light energy is greater than a predetermined light threshold value corresponding to a preselected voltage threshold for the voltage under test. The light sensitive means includes means for varying the light threshold at which the electrical signal is developed thereby varying the voltage threshold for the voltage under test. Indicating means are also provided and are responsive to the electrical signal for developing an alarm signal having a predetermined magnitude independent of the magnitude of the voltage under test to indicate that the voltage under test has a magnitude greater than the selected voltage threshold value.

All of the elements of the voltage detector are housed in an elongated unitary casing comprising insulating material. The detecting means comprises a contact member for application to a load receiving the voltage under test and which has a portion thereof projecting from one end of the unitary casing. The detecting means also comprises a glow lamp having two electrodes, one of which is connected to the contact member and the other is connected to the internal circuit ground of the voltage detector. The two electrodes develop an illuminating discharge region having an area proportional to the magnitude of the voltage under test.

The means for varying the light threshold comprises a movable screen disposed between the glow lamp and the light sensitive means and has means defining a tubular aperture therethrough to permit the light energy for the glow lamp to pass therethrough and means for adjustably moving the screen and thereby the aperture with respect to the discharge region to adjustably define the minimum area of the region necessary to pass light through the aperture.

The light sensitive means comprises a light sensitive variable resistance element and means responsive to the changes in resistance of the variable resistance element for developing the electrical signal. The indicating means comprises means responsive to the electrical signal for emitting visible light or for emitting audible sound.

The voltage detector further comprises testing means for testing the operation of the voltage detector when the voltage detector is not receptive of a voltage under test. The testing means comprises means for developing light energy when energized and for transmitting the light energy to the light sensitive means to enable same to develop the electrical signal and manually actuatable means for energizing the means for developing light energy.

In another embodiment of the present invention, a spark gap is placed in series between the contact member and one electrode of the glow lamp to discharge high voltages thereacross to enable the voltage detector to be used to detect high voltages.

Having in mind the above and other objects that will be obvious from the understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawings.

DETAILED DESCRIPTION OF THE PREFERRED EMBODIMENTS

Reference is simultaneously made to FIGS. 1, 2, 3, 4 and 5 in the following description of the invention.

Figure 1:
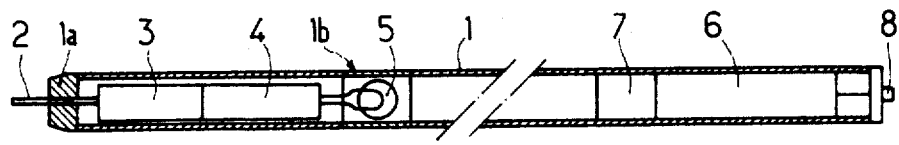
FIG. 1 is an axial sectional view of one embodiment of the voltage detector according to the present invention.

The different mechanical parts of this detector, represented in FIG. 1 show that it is housed in a unitary casing constituted essentially by an insulating tube 1 having a portion 1b which is totally or partially transparent. This tube can have, for example, a length of 800mm and a diameter from 30 to 35mm.

One end of the tube 1 is closed by an insulating stopper 1a, in which is mounted a metallic contact point or member 2 projecting axially the tube. This contact point 2 is connected to the other detecting circuitry which is disposed in the interior of the tube at 3 and is connected to light sensitive means including the amplification circuit which is disposed at 4. The amplification circuit which is disposed at 4. The amplification circuit which is disposed at 4. The amplification circuitry will be described in detail later with reference to FIG. 3. The contact of the amplification circuit is connected to indicating means including indicator lamp 5 which is visible through the transparent part 1b of tube 1.

The insulating tube 1 has disposed in the other end portion thereof, opposite the end portion wherein the contact member is mounted, electric supply means for supplying dc current comprising two batteries 6 and 7 having the respective voltages of 4, 5 and 9 volts, for example. The tube 1 also has mounted at this end portion, manually actuatable means comprising button 8 which is included in testing means for verifying the proper functioning of the voltage detector. The batteries 6 and 7 are permanently connected and the consumption of the current when the detector is inoperative is very low, i.e., less than $10^{-6}$ amperes, so that there is very little drain on the batteries.

Figure 2:
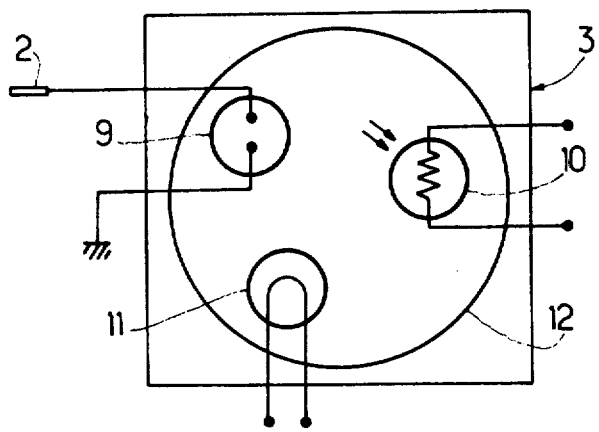
FIG. 2 is a diagram of the detector in FIG. 1.

The detector will now be described in detail referring to FIG. 2. The detecting means comprises a glow lamp 9, having a gas therein such as neon or another rare gas, connected to the contact member 2. A photo-electric resistance element 10 which is part of the light sensitive means and a low voltage incandescent lamp 11 which is part of testing means are also shown. The glow lamp 9, the resistance element 10 and lamp 11 are grouped in the same opaque box 12 and they are disposed in such a manner that the photo-electric resistance element 10 can be illuminated by the neon lamp 9, or by the incandescent lamp 11.

Figure 3:
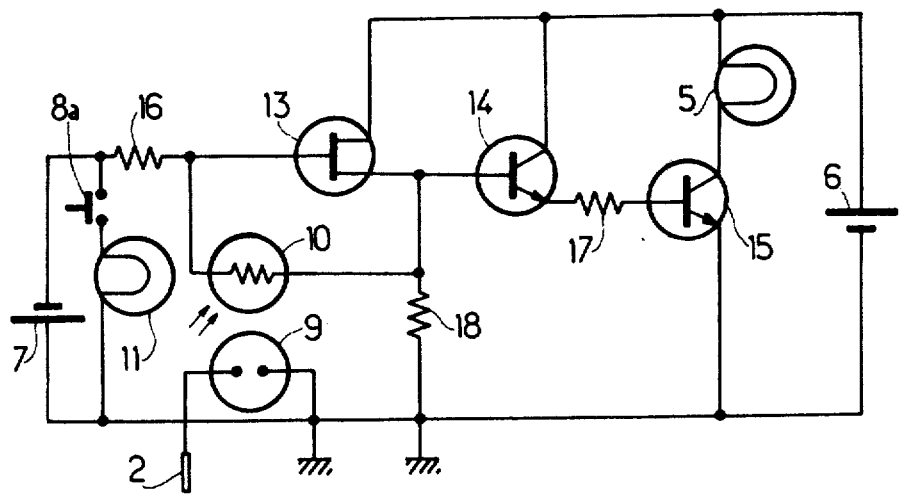
FIG. 3 is a circuit diagram of the detection and amplification circuit of the detector of FIG. 1.

The connections of these various elements appear on the circuit diagram of FIG. 3. One of the electrodes of the neon lamp 9 is connected to means defining an internal circuit ground including the frame of the amplification circuit at 4. The internal ground of the voltage detector is connected by a wire or other conductor (not shown) to earth ground during use. The other electrode is connected to the contact point 2. The lamp 11 is connected in series with a switch 8a controlled by the push button 8, to the terminals of the battery 7 whose positive pole is connected to the internal ground. The negative pole on the other battery 6 is also connected to circuit ground.

The negative pole of the battery 7 is connected through resistor 16 to the base of field-effect transistor transistor 13, whose source is connected to circuit ground through resistor 18. The drain is connected to the positive pole of the battery 6. The photo-electric resistance element 10 is connected across the base and the source of the field-effect transistor 13.

The source of the field-effect transistor 13 is connected to the base of a first NPN type transistor 14 whose collector is connected to the positive pole of the battery 6 and whose emitter is connected through resistor 17 to the base of a second NPN type transistor 15. The emitter-collector junction of transistor 15 is connected in series with the indicator lamp 5 and the battery 6.

The operation of the device which has just been described is as follows: in order to verify that the detection device is working, the operator presses the button 8, which results in the closing of the switch 8a and causes the lighting up of the lamp 11. The light energy of lamp 11 is transmitted to the photo-electric resistance element 10. The value of the resistance of the element then diminishes, which causes the transistor 13 to become conductive and as a consequence, puts transistors 14 and 15 into the conductive state. The indicator lamp 5 then lights, which indicates the proper functioning of the device. By means of this amplification circuitry, the indicator lamp 5 is always lit to a predetermined brightness independent of the magnitude of the voltage under test. Thus the lamp 5 can be seen even in bright sunlight.

In order to detect the existence of an alternating voltage on a load, the operator applies the contact member 2 into contact with the load. If the alternating voltage that is detected is higher than a selected threshold value, the neon lamp 9 lights weakly due to the capacitance existing between the ground of the device and earth ground. The photo-electric resistance element 10 which is then lit by the neon lamp 9 decreases in resistance and this results, as explained in the preceding case, in the lighting of the indicator lamp 5. The operator can thus verify, seeing the lamp 5 lit to a predetermined brightness through the transparent part 1b of the tube 1, that an alternating voltage is present on the load that is being tested that is higher than a selected threshold value.

Figure 4:
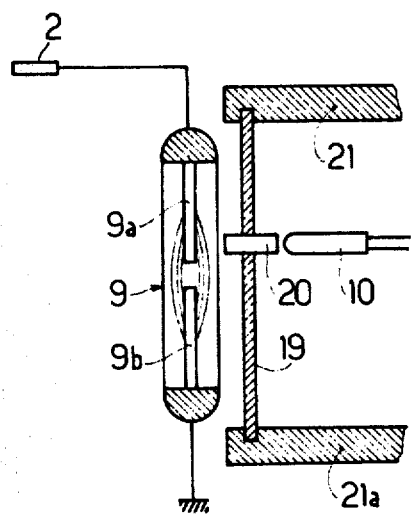
FIG. 4 is a diagram of a modification of the detector of FIG. 1.

In a modification illustrated in FIG. 4, the neon lamp 9 comprises two coaxial elongated electrodes 9a and 9b facing each other and disposed parallel to an optical screen 19 having a tubular aperture 20. Opposite this aperture is disposed the photo-electric resistance element 10.

When the contact point 2 which is connected to the electrode 9a, is put into contact with a load carrying an alternating voltage, a discharge between the electrodes 9a and 9b begins in the region about the gap which varies in length and area as a function of the detected voltage. The more this voltage is increased, the more the discharge region is elongated. When the discharge zone arrives opposite the aperture 20, the photo-electric resistance element 10 is then lit up and this causes the resulting illumination of the indicator lamp 5 as explained before. As a consequence, this structure permits one to obtain a variable threshold of detection which is indicated by the illumination of the indicator lamp 5. Below the selected voltage threshold, the discharge is not sufficiently elongated to illuminate the photo-electric resistance element 10 and the lamp 5 remains turned off.

If one wants to vary the voltage detection threshold, means including 21 and 21a are provided for adjusting the relative position of the aperture 20 in relation to the electrode 9a.

The screen 19 and thus the aperture 20 is moved so that only a selected discharge region will effect the illumination of the photo-electric resistance element 10. Therefore movement of the aperture away from or towards the gap between electrodes 9a and 9b along the line of the two electrodes results in a variation in the voltage threshold since it takes a correspondingly greater or lesser voltage to cause a discharge that is long enough to reach the aperture. Thus by means of displacement of the optical screen, the aperture 20 is moved and the position thereof defines a corresponding voltage threshold.

Figure 5:
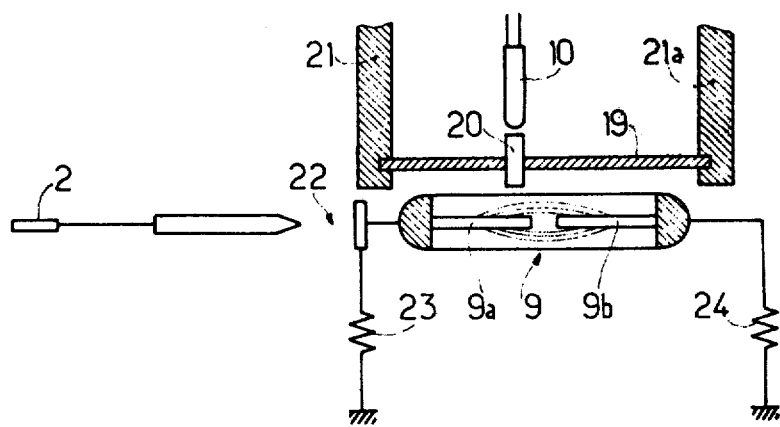
FIG. 5 is an diagram of another modification of the detector of FIG. 1.

For the detection of high voltages (greater than 1,000 volts) it is advisable to use the circuitry represented in FIG. 5. The circuitry comprises means defining spark gap 22, one of whose electrodes is connected to contact member 2 and the other of whose electrodes is connected to the electrode 9a of the neon lamp 9 and to circuit ground through resistor 23. Resistor 23 has a value on the order of 1 to 10 kilo/ohms for the detection of 100,000 volts. This resistor makes it possible to define the range of detected voltage. The other electrode 9b of the neon lamp is connected to circuit ground through a protection resistor 24 having a high value of resistance of several million ohms.

In all of the embodiments of the invention that have been described, the indicator lamp 5 can be replaced or completed by a sound warning device that emits an audible sound.

According to another modification, the device can be adapted in a manner such as to detect, by the illumination of the indicator lamp 5, the absence of a voltage on a load. In this case, it is sufficient to place the resistor 18 (FIG. 3) in series with the drain of the field-effect transistor 13 instead of being connected to the source as illustrated in FIG. 3.

According to another modification, one can effect the internal test to indicate that the detector is functioning properly by means of a device which produces a sufficient voltage to light the neon bulb 9. In this case, a relay functioning as a bell develops a voltage of several hundred volts between the two terminals which can be directly applied to the neon tube 9.

While preferred embodiments have been shown by way of example in the drawings it will be understood that the invention is in no way limited to these embodiments.

What I claim is:

1. A voltage detector comprising: a glow lamp having two spaced apart electrodes responsive to a voltage under test during use for developing light energy in an illuminating discharge region having an area proportional to the magnitude of the voltage under test;

light sensitive means responsive to said light energy for developing an electrical signal in response thereto;

a movable screen disposed between said glow lamp and said light sensitive means and having means defining a tubular aperture therethrough to permit the light energy from said glow lamp to pass therethrough and illuminate said light sensitive means to develop the electrical signal;

means for adjustably positioning said screen relative to said glow lamp and said light sensitive means to define the area of said discharge region which will illuminate said light sensitive means and thereby determine a voltage threshold for the voltage under test above which the electrical signal will be developed; and indicating means responsive to said electrical signal for developing an alarm signal having a predetermined magnitude independent of the magnitude of the voltage under test to indicate that the voltage under test has a magnitude greater than the voltage threshold value.

2. A voltage detector according to claim 1, further comprising means defining an internal circuit ground, and a contact member receptive of the voltage under test and connected to one of said electrodes of said glow lamp, and wherein the other electrode is connected to said internal circuit ground.

3. A voltage detector according to claim 2, further comprising means defining a discharge spark gap connected in series between said contact member and said one electrode.

4. A voltage detector according to claim 2, further comprising a elongated unitary casing comprising insulating material and having all of said means disposed therein and a portion of said contact member projecting from one end thereof.

5. A voltage detector according to claim 4, further comprising power supply means disposed in said casing for supplying electrical power to said light sensitive means and said indicating means.

6. A voltage detector according to claim 1, wherein said light sensitive means comprises a light sensitive variable resistance element.

7. A voltage detector according to claim 6, wherein said light sensitive means further comprises means responsive to the change in resistance of said variable resistance element for developing said electrical signal.

8. A voltage detector according to claim 1, wherein said indicating means comprises means responsive to said electrical signal for emitting visible light.

9. A voltage detector according to claim 1, wherein said indicating means comprises means responsive to said electrical signal for emitting audible sound.

10. A voltage detector according to claim 1, further comprising testing means for testing the operation of said voltage detector when same is not receptive of a voltage under test.

11. A voltage detector according to claim 10, wherein said testing means comprises means for developing light energy when energized and for transmitting said light energy to said light sensitive means to enable same to develop said electrical signal and manually actuatable means for energizing said means for developing light energy.

12. A voltage detector according to claim 1, wherein said two electrodes are elongated and disposed in a longitudinal line in a spaced apart relationship defining a gap therebetween and wherein said tubular aperture faces said gap and wherein said means for adjustably positioning said screen moves said aperture along said longitudional line.

* * * * *